United States Patent
Nusier et al.

(10) Patent No.: US 10,363,968 B2
(45) Date of Patent: Jul. 30, 2019

(54) ROCKER ASSEMBLY FOR AUTONOMOUS VEHICLE

(71) Applicant: FORD GLOBAL TECHNOLOGIES, LLC, Dearborn, MI (US)

(72) Inventors: Saied Nusier, Canton, MI (US); Mohamed Ridha Baccouche, Ann Arbor, MI (US); Saeed David Barbat, Novi, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/807,069

(22) Filed: Nov. 8, 2017

(65) Prior Publication Data
US 2019/0135349 A1 May 9, 2019

(51) Int. Cl.
*B60J 5/04* (2006.01)
*B62D 25/02* (2006.01)
*B60J 5/06* (2006.01)

(52) U.S. Cl.
CPC .......... *B62D 25/025* (2013.01); *B60J 5/0479* (2013.01); *B60J 5/06* (2013.01)

(58) Field of Classification Search
CPC .... B62D 25/025; B62D 21/157; B60J 5/0479; B60J 5/06
USPC ....................................................... 296/209
See application file for complete search history.

(56) References Cited

U.S. PATENT DOCUMENTS

| | | | |
|---|---|---|---|
| 6,183,039 B1 * | 2/2001 | Kohut | E05D 15/1081 296/146.12 |
| 6,193,306 B1 | 2/2001 | Lee | |
| 6,409,257 B1 | 6/2002 | Takashina et al. | |
| 6,899,374 B1 * | 5/2005 | Heard | B60J 5/047 296/155 |
| 7,163,258 B2 * | 1/2007 | Dyer, II | B62D 25/02 280/768 |
| 8,608,232 B2 | 12/2013 | Engertsberger et al. | |
| 2017/0137075 A1 * | 5/2017 | Povinelli | B62D 35/008 |
| 2017/0210427 A1 | 7/2017 | Akhlaque-e-rasul et al. | |

FOREIGN PATENT DOCUMENTS

DE   102014001092   7/2015

* cited by examiner

*Primary Examiner* — Pinel E Romain
(74) *Attorney, Agent, or Firm* — Vichit Chea; Brooks Kushman P.C.

(57) ABSTRACT

An autonomous vehicle including a body defining a door opening for a front door and a rear door. The doors are attached to the body a track that guides the doors between an open position and a closed position. A rocker assembly includes an outer rocker panel defining a slot, an inner rocker panel attached to the outer rocker panel, and an insert including an upper tube and a lower tube disposed between the outer rocker panel and the inner rocker panel. The tubes extend between a front end and a rear end of the rocker assembly, a track is assembled between the upper and lower tubes, and the slot in the outer rocker panel provides access to the track for brackets that have rollers that engage the track. The brackets are attached to the doors.

15 Claims, 2 Drawing Sheets

ROCKER ASSEMBLY FOR AUTONOMOUS VEHICLE

TECHNICAL FIELD

This disclosure relates to a rocker assembly for a vehicle that may be an autonomous vehicle that has dual sliding doors on both sides of the vehicle with a front door opening in the forward direction and a rear door opening in the rearward direction and no roof support pillar being provided between the front and rear door.

BACKGROUND

Autonomous vehicles that are being developed are making possible new designs that may allow new seating arrangements. For example, the front seat passenger or driver may position the front seat to face rearwardly to provide a face-to-face seating arrangement with rear seat passengers. Such an arrangement would make conversation easier and facilitate interacting with children in the back seat. In addition to potential changes in seating arrangements, new approaches to facilitating ingress and egress to the passenger compartment are being developed.

The new vehicle designs are expected to be required to meet the same vehicle tests as developed for conventional vehicles and will also be subject to new tests. One test is a test of a rocker assembly in a side impact with a pole. In conventional vehicle designs that include a B-pillar disposed at an intermediate location on each side of the vehicle between the front and rear doors, the B-pillar functions to minimize intrusion into the passenger compartment in side impacts with a pole. Greater intrusions into the passenger compartment in a side impact with a pole test are predicted based upon computer aided design tests if the B-pillar is removed from the sides of the vehicle. In addition, load paths developed for vehicles having a B-pillar are inadequate for vehicle designs that eliminate the pillar between the front and rear doors.

This disclosure is directed to solving the above problems and other problems as summarized below.

SUMMARY

According to one aspect of this disclosure, a rocker assembly is disclosed that includes an outer rocker panel defining a slot, an inner rocker panel attached to the outer rocker panel and an insert including an upper tube and a lower tube disposed between the outer rocker panel and the inner rocker panel. The tubes extend between a front end and a rear end of the rocker assembly. A track is assembled between the upper and lower tubes with the slot providing access to the track.

According to additional aspects of this disclosure, the upper and lower tubes may bridge a central portion of the inner rocker panel between the front and rear ends. The tubes are connected to the inner rocker panel and are welded to the outer rocker panel at an intermediate portion of the upper and lower tubes between the front and rear ends that is spaced from the inner rocker panel. A space is defined between the upper and lower tubes, and the track extends across the central portion of the inner rocker panel. The rocker assembly may further comprise an upper spacer is connected between the inner rocker panel and the upper tube. A lower spacer is connected between the inner rocker panel and the lower rail.

The rocker assembly may be for a vehicle having a front door and a rear door. The rocker assembly may further comprise a front upper spacer connected between the inner rocker panel and the upper tube below a front door. A front lower spacer is connected between the inner rocker panel and the lower rail below the rear door. The rear upper spacer may also be connected between the inner rocker panel and the upper tube below the rear door with a rear lower spacer may be connected between the inner rocker panel and the lower rail below the rear door. The spacers may have an arcuate intermediate portion that is adapted to be attached to one of the tubes and a front end and a rear end that are adapted to be attached to the inner rocker panel.

According to another aspect of this disclosure, a vehicle is disclosed that includes a body defining a door opening, a front door and a rear door. The front door is attached to the body by at least one track that guides the front door between an open position forward of the door opening and a closed position partially covering the door opening. The rear door is attached to the body by the track that guides the rear door between an open position rearward of the door opening and a closed position partially covering the door opening. A rocker assembly includes an outer rocker panel defining a slot, an inner rocker panel attached to the outer rocker panel, and a reinforcement insert including an upper tube and a lower tube disposed between the outer rocker panel and the inner rocker panel. The tubes extend between a front end and a rear end of the rocker assembly. A track is assembled between the upper and lower tubes that provides access to the track for brackets supporting rollers that engage the track. The brackets are attached to the doors.

According to another aspect of this disclosure, a rocker assembly is disclosed that includes an outer rocker panel, an inner rocker panel, and a reinforcing insert. The insert includes a pair of vertically spaced rails attached at front and rear rail ends to the inner rocker panel. The rails are spaced from the inner rocker panel between the rail ends. The front and rear brackets each include an upper arcuate spacer and a lower arcuate spacer that are each connected between the inner rocker panel and one of the pair of rails.

According to other aspects of this disclosure, the arcuate spacers may have an intermediate arcuate portion and a front end and a rear end oriented to provide a line of contact with a plurality of retainers that are adapted to be welded to the inner rocker panel. The spaced rails may have an intermediate portion attached to an inner surface of the outer rocker panel.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
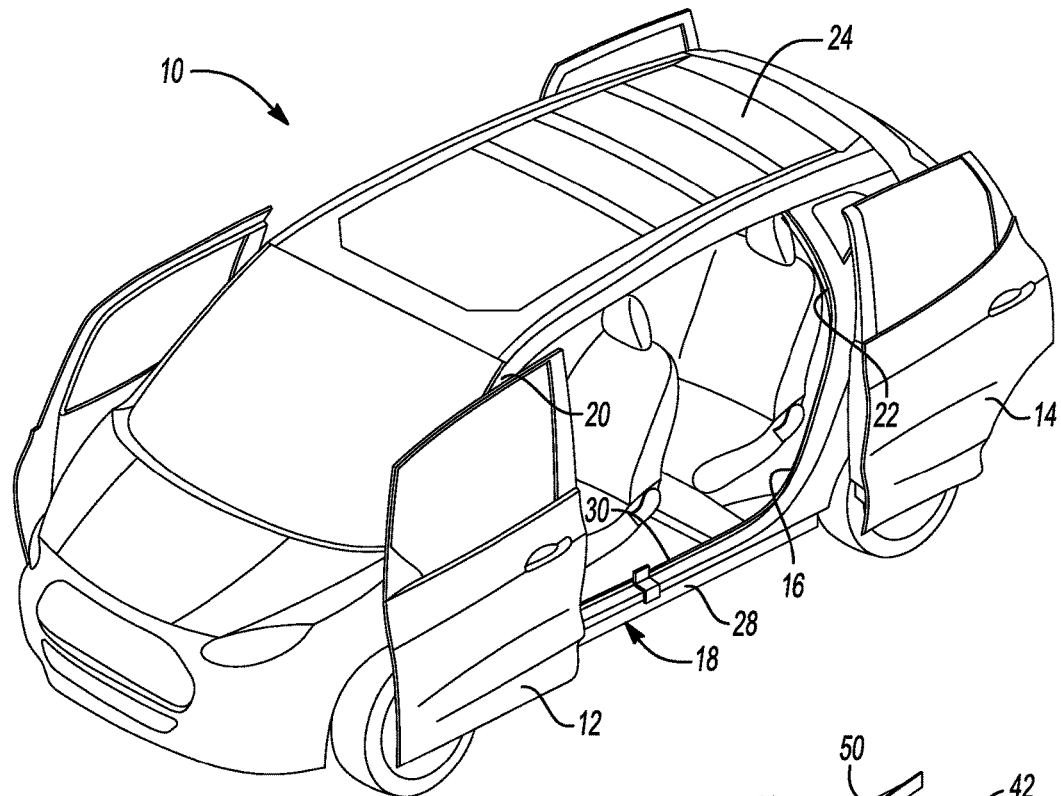
FIG. 1 is a perspective view of a vehicle having a front sliding door and a rear sliding door on both sides of the vehicle.

Referring to FIG. 1, the vehicle 10 is shown that includes a front door 12 and a rear door 14 on each side of the vehicle 10. The front door 12 and rear door 14 slide to open and close a door opening 16. A rocker assembly 18 spans the lower portion of the door opening 16 and extends from an A-pillar 20 to a C-pillar 22. The A-pillar 20 and C-pillar 22 support a roof 24 of the vehicle 10. The A-pillar 20 is located at the front end of the passenger compartment and extends upwardly on opposite sides of the windshield. The C-pillar 22 is provided in the rear portion of the vehicle 10. Normally, a B-pillar (not included and not shown) normally would be provided between the A-pillar and the C-pillar 20, 22. However, the vehicle 10 may be an autonomous vehicle that allows for the front row of seats to face rearwardly to provide a face-to-face seating. By eliminating the B-pillar, ingress and egress from the passenger compartment is facilitated and the flexibility of seating arrangements made possible autonomous vehicle design is maximized. Because the B-pillar is eliminated, additional structural strength must be provided by the rocker assembly 18.

Figure 2:
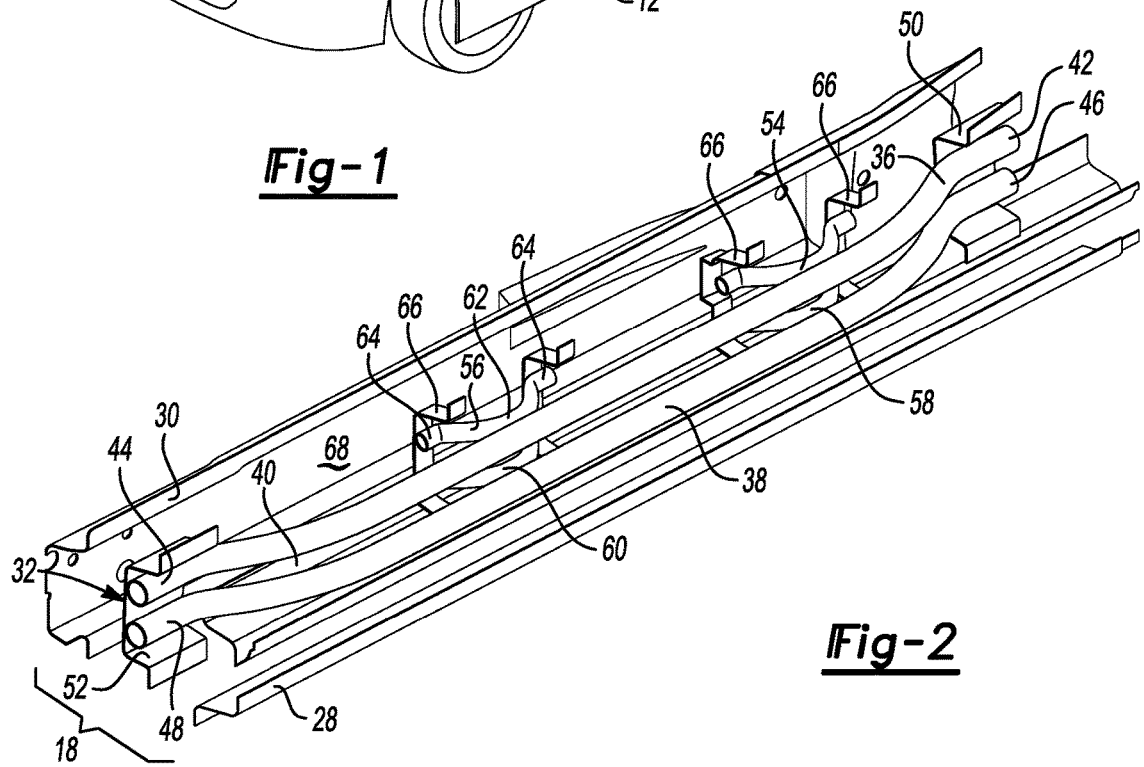
FIG. 2 is a partial perspective view of a rocker assembly with part of the rocker removed to illustrate a rocker reinforcement.

Referring to FIG. 2, a rocker assembly 18 is partially illustrated that includes an outer rocker panel 28 (partially shown in this view) and an inner rocker panel 30. A reinforcement insert 32 is secured within the rocker assembly 18 between the outer rocker panel 18 and the inner rocker panel 30. The reinforcement insert generally indicated by reference numeral 32 includes an upper rail 36 and a lower rail 38. The upper and lower rails are preferably tubular members; but, may also be formed as a composite tube including a filler or as a solid rail. A space is defined between the upper rail 36 and lower rail 38 define a space 40. The upper rail 36 is spaced vertically above the lower rail 38.

As shown in FIG. 2, the upper rail 36 and lower rail 38 extend in the longitudinal vehicle direction. The upper rail 36 includes a front upper rail end 42 and a rear upper rail end 44. Similarly, the lower rail 38 includes a front lower rail end 46 and rear lower rail end 48. The upper rail 46 is connected through a front bracket 50 to the inner rocker panel 30. The front upper rail end 42 and front lower rail end 46 are connected through a front bracket 52 to the inner rocker panel 30. The rear upper rail end 44 and rear lower rail end 48 are connected through a rear bracket 50 to the inner rocker panel 30.

The upper rail 36 is connected by an upper front arcuate spacer 56 and an upper rear arcuate spacer 54 to the inner rocker panel 30. The upper front arcuate spacer 56 and upper rear arcuate spacer 54 provide a load path in the event of a side collision that transfers side impact loads from the upper rail 36 through the arcuate spacers 54 and 56 to the inner rocker panel 30. The lower front arcuate spacer 58 and lower rear arcuate spacer 60 are connected between the lower rail 36 and the inner rocker panel 30 and provide a side impact load path from the lower rail 36 through the arcuate spacers 58 and 60 to the inner rocker panel 30.

Each of the arcuate spacers 54, 56, 58 and 60 include an intermediate arcuate portion 62 and two end portions 64. The intermediate arcuate portion 62 is attached, preferably by welding, to the upper and lower rails 36 and 38, respectively. The end portions 64 are preferably welded to the inner rocker panel 30. The rails and spacer are generally cylindrical in shape and a line of contact is provided where the rails 36 and 38 and spacers 54, 56, 58 and 60 are welded to the inner rocker panel 30. The rail ends 42, 44, 46 and 48 and end portions 64 of the arcuate spacers 54, 56, 58 and 60 are welded to the inner surface 68 of the inner rocker panel 30.

Figure 3:
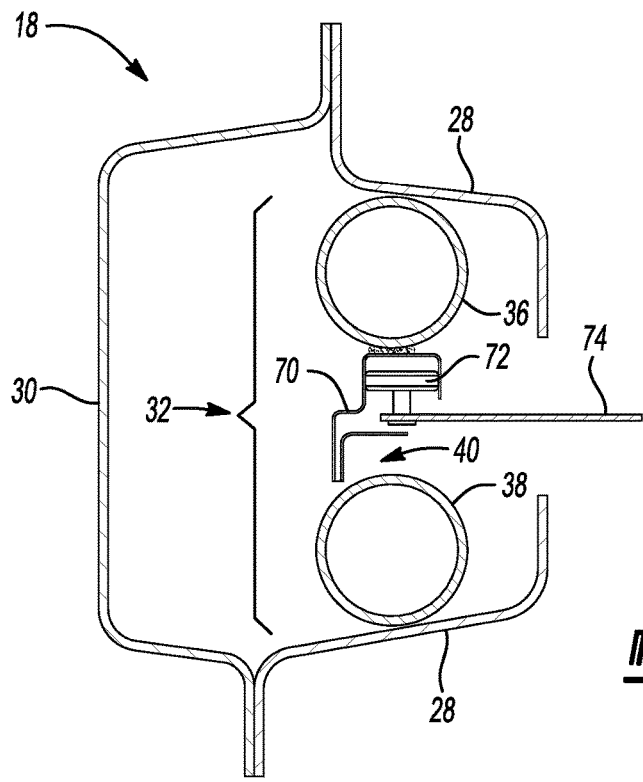
FIG. 3 is a cross-section view of the rocker assembly and a door roller guide bracket.

Referring to FIG. 3, the rocker assembly 18 is shown in cross-section with the outer rocker panel 28 being attached at upper and lower ends to the inner rocker panel 30. The upper rail 36 is welded to the outer rocker panel 28. The lower rail 38 is welded to the outer rocker panel 28. A track 70 is welded to the upper rail 36 and is adapted to receive a roller 72. The roller 72 as shown is rotatable about a vertical axis but it should be understood the different design for door mounting structures may include a roller (not shown) having a horizontal axis of rotation. In some cases, two rollers may be provided on an end of a front door roller guide bracket 74. The roller 72 follows the track 70 as the front door (not shown in FIG. 3) is open and closed.

Figure 4:
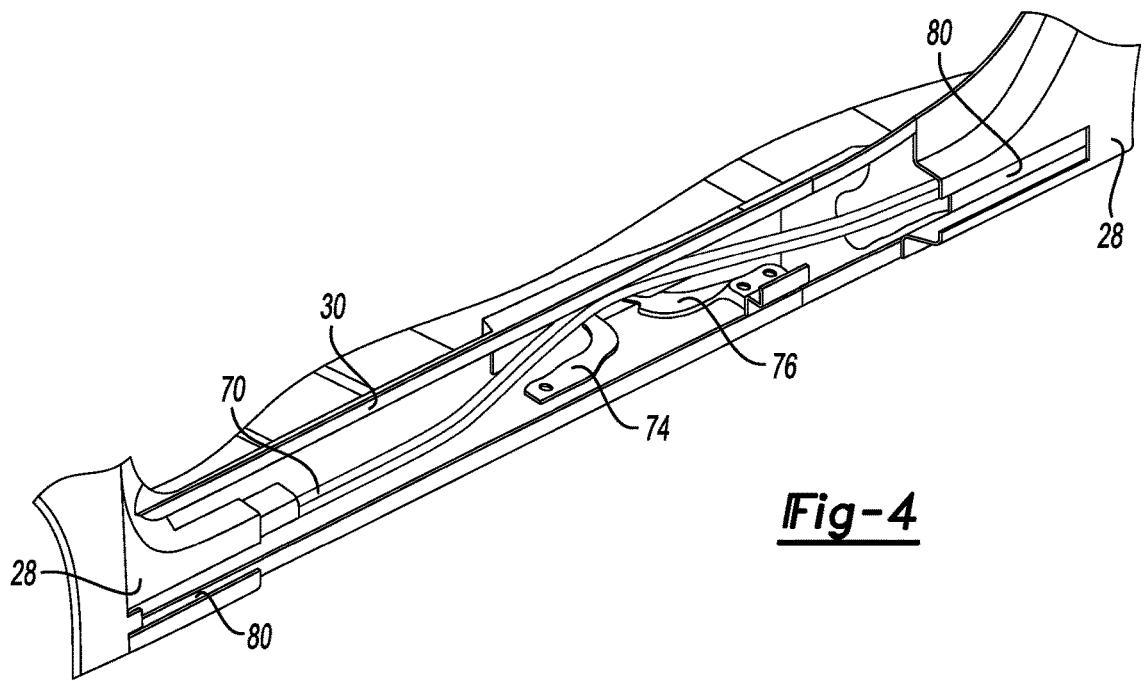
FIG. 4 is a partial perspective view of a rocker assembly with part of the rocker removed to illustrate a track and a pair of door roller guide brackets.

Referring to FIG. 4, another view of the rocker assembly 18 is shown with portions of the structure removed to better illustrate the track 70. The track 70 is provided to guide movement of the front door 12 and rear door 14 (not shown in FIG. 4). The front door roller guide bracket 74 is shown in registry with the track 70 and a rear door roller guide bracket 76 is shown in registry with the track 70. A slot 80 is defined in the outer rocker panel 28 that provides clearance for movement of the front and rear door roller guide brackets 74 and 76.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rocker assembly comprising:
    an outer rocker panel defining a slot;
    an inner rocker panel attached to the outer rocker panel;
    an insert including an upper tube and a lower tube disposed between the outer rocker panel and the inner rocker panel, the upper and lower tubes extending between a front end and a rear end of the rocker assembly; and
    a track assembled between the upper and lower tubes, wherein the slot provides access to the track.

2. The rocker assembly of claim 1 wherein the upper and lower tubes bridge a central portion of the inner rocker panel between the front and rear ends thereof that are connected to the inner rocker panel and are welded to the outer rocker panel at an intermediate portion of the upper and lower tubes between the front and rear ends that is spaced from the inner rocker panel.

3. The rocker assembly of claim 2 wherein a space is defined between the upper and lower tubes, and wherein the track is disposed in the space in the central portion of the inner rocker panel.

4. The rocker assembly of claim 3 further comprising:
    an upper spacer connected between the inner rocker panel and the upper tube and a lower spacer connected between the inner rocker panel and a lower rail.

5. The rocker assembly of claim 3 for a vehicle having a front door and a rear door, further comprising:
    a front upper spacer connected between the inner rocker panel and the upper tube below a front door, and a front lower spacer connected between the inner rocker panel and a lower rail below the rear door: and a rear upper spacer connected between the inner rocker panel and the upper tube below the rear door, and a rear lower spacer connected between the inner rocker panel and the lower rail below the rear door.

6. The rocker assembly of claim 5 wherein the spacers have an arcuate intermediate portion that is adapted to be attached to one of the upper and lower tubes and a front end and a rear end that are adapted to be attached to the inner rocker panel.

7. A vehicle comprising:

a body defining a door opening;

a front door attached to the body by at least one track that guides the front door between an open position forward of the door opening and a closed position partially covering the door opening;

a rear door attached to the body by the track that guides the rear door between an open position rearward of the door opening and a closed position partially covering the door opening; and a rocker assembly including an outer rocker panel defining a slot, an inner rocker panel attached to the outer rocker panel, an insert including an upper tube and a lower tube disposed between the outer rocker panel and the inner rocker panel, the upper and lower tubes extending between a front end and a rear end of the rocker assembly, and a track assembled between the upper and lower tubes, wherein the slot provides access to the track for brackets attached to the doors having rollers that engage the track.

8. The vehicle of claim 7 wherein the upper and lower tubes bridge a central portion of the inner rocker panel between the front and rear ends thereof that are connected to the inner rocker panel and are welded to the outer rocker panel at an intermediate portion of the upper and lower tubes between the front and rear ends that is spaced from the inner rocker panel.

9. The vehicle of claim 8 wherein a space is defined between the upper and lower tubes, and wherein the track is disposed in the space in the central portion of the inner rocker panel.

10. The vehicle of claim 9 further comprising:

an upper spacer connected between the inner rocker panel and the upper tube and a lower spacer connected between the inner rocker panel and a lower rail.

11. The vehicle of claim 9 for a vehicle having the front door and the rear door, further comprising:

a front upper spacer connected between the inner rocker panel and the upper tube below the front door, and a front lower spacer connected between the inner rocker panel and a lower rail below the rear door: and a rear upper spacer connected between the inner rocker panel and the upper tube below the rear door, and a rear lower spacer connected between the inner rocker panel and the lower rail below the rear door.

12. The vehicle of claim 11 wherein the spacers have an arcuate intermediate portion that is adapted to be attached to one of the tubes and a front end and a rear end that are adapted to be attached to the inner rocker panel.

13. A rocker assembly comprising:

an outer rocker panel;

an inner rocker panel; and an insert including a pair of vertically spaced rails attached at front and rear rail ends to the inner rocker panel and is spaced from the inner rocker panel between the rail ends; and front and rear brackets each including an upper arcuate spacer and a lower arcuate spacer each being connected between the inner rocker panel and one of the pair of rails.

14. The rocker assembly of claim 13 wherein the arcuate spacers have an intermediate arcuate portion, a front end and a rear end each attached to a plurality of retainers that are welded to the inner rocker panel.

15. The rocker assembly of claim 13 wherein the spaced rails have an intermediate portion attached to an inner surface of the outer rocker panel.

\* \* \* \* \*